No. 818,608. PATENTED APR. 24, 1906.
G. W. BROWER.
SUSPENDED RAILWAY.
APPLICATION FILED JAN. 31, 1906.
7 SHEETS—SHEET 5.
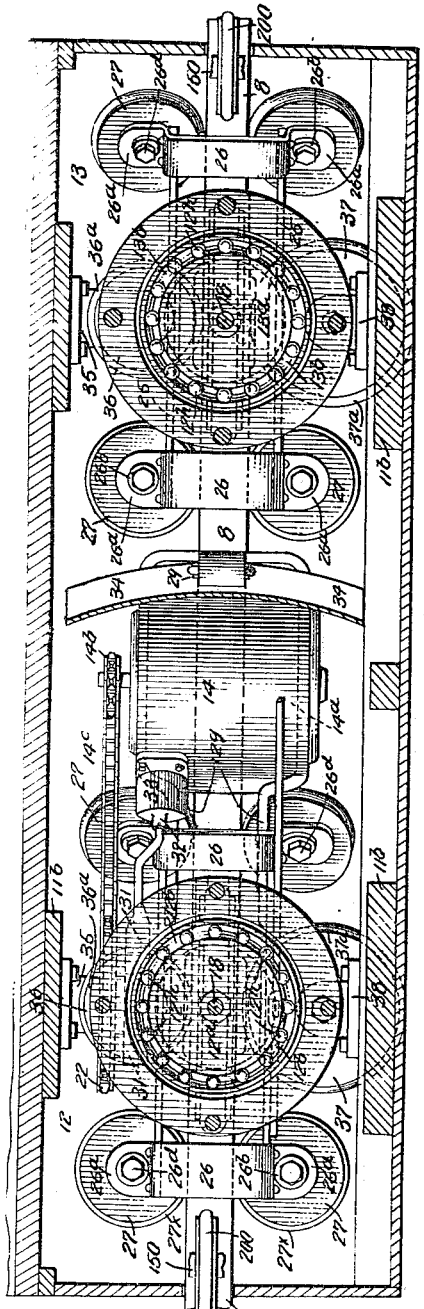
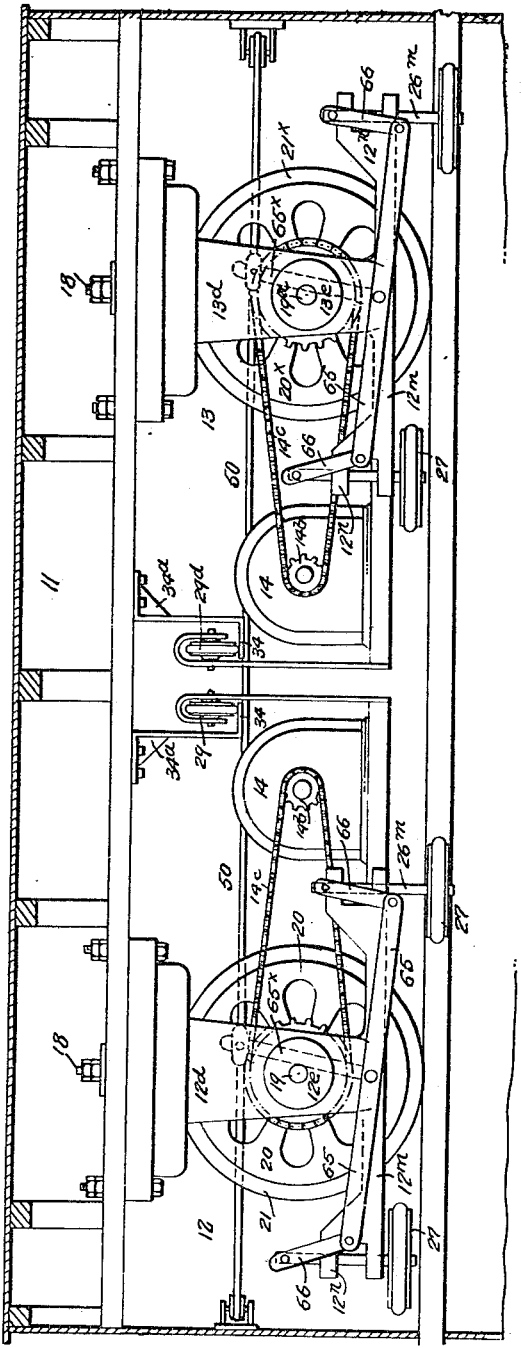
WITNESSES:
INVENTOR
George W. Brower.
BY
Fred G. Dieterich
ATTORNEYS No. 818,608. PATENTED APR. 24, 1906.
G. W. BROWER.
SUSPENDED RAILWAY.
APPLICATION FILED JAN. 31, 1906.
7 SHEETS—SHEET 6.
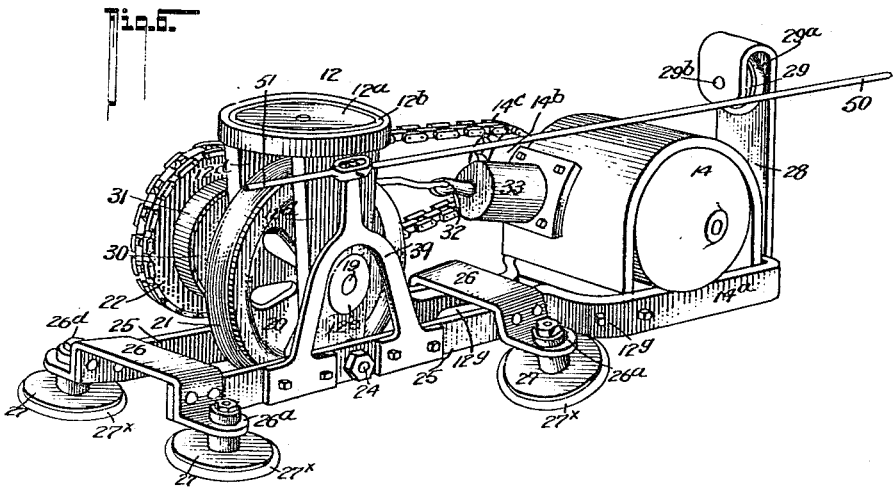
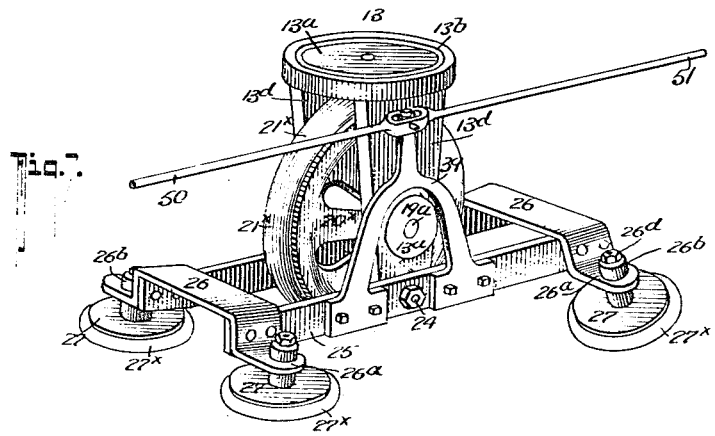
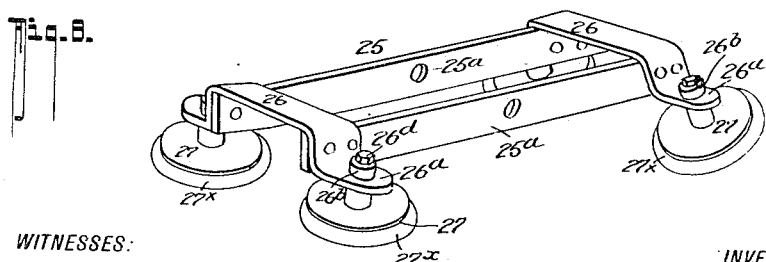
WITNESSES:
John T. Schrott
F. C. Gibson
INVENTOR
George W. Brower.
BY
Fred G. Dieterich & Co.
ATTORNEYS

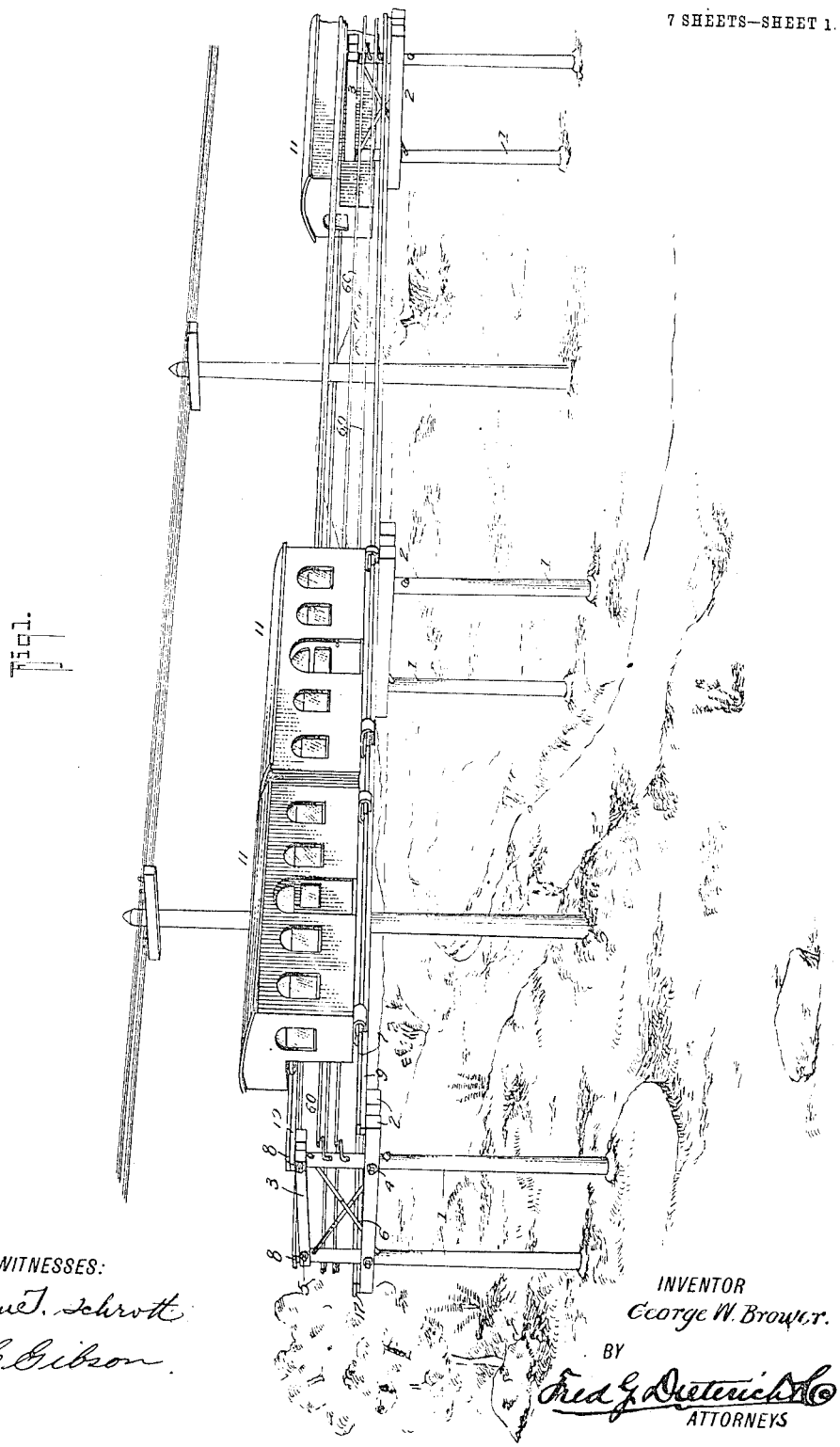

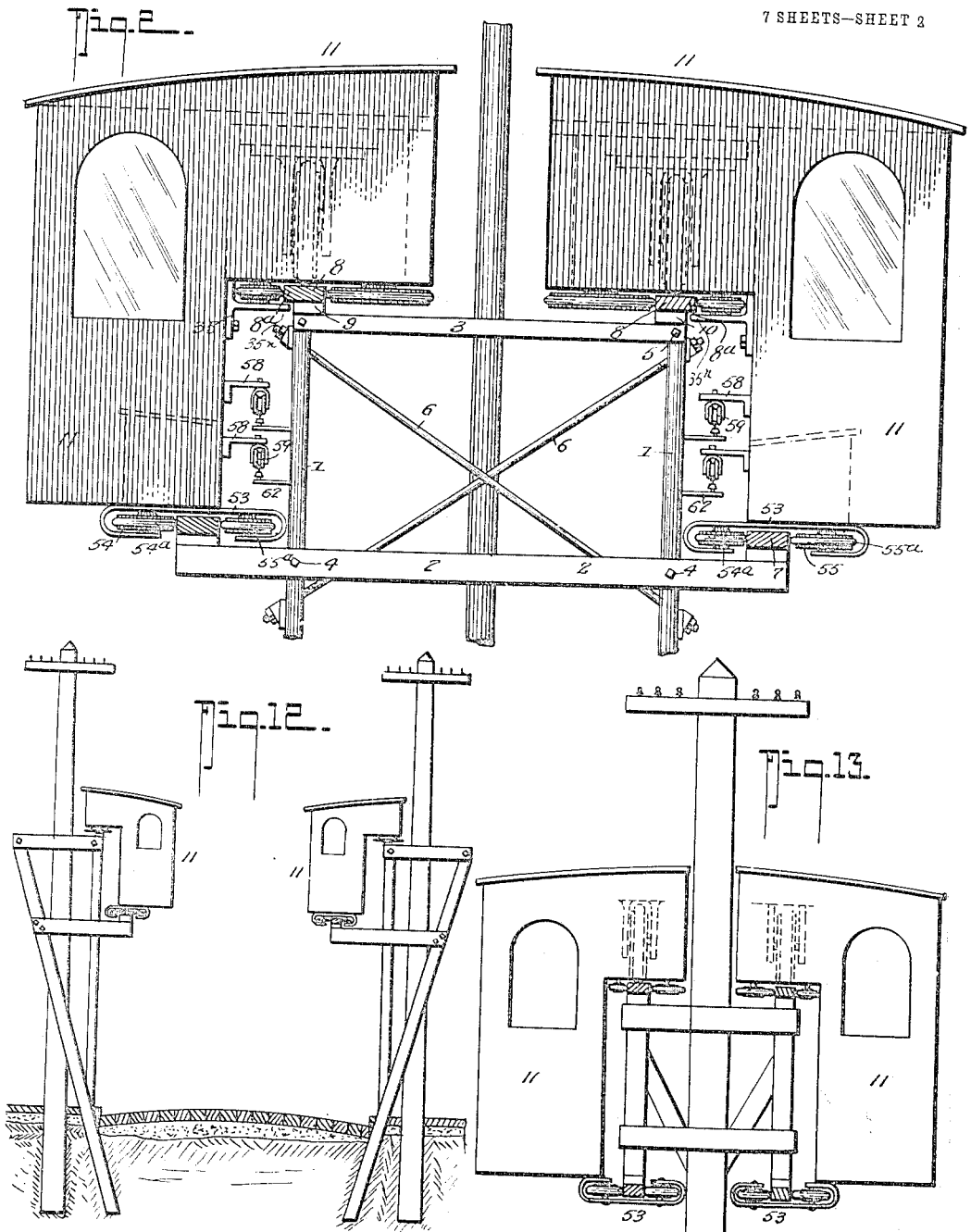

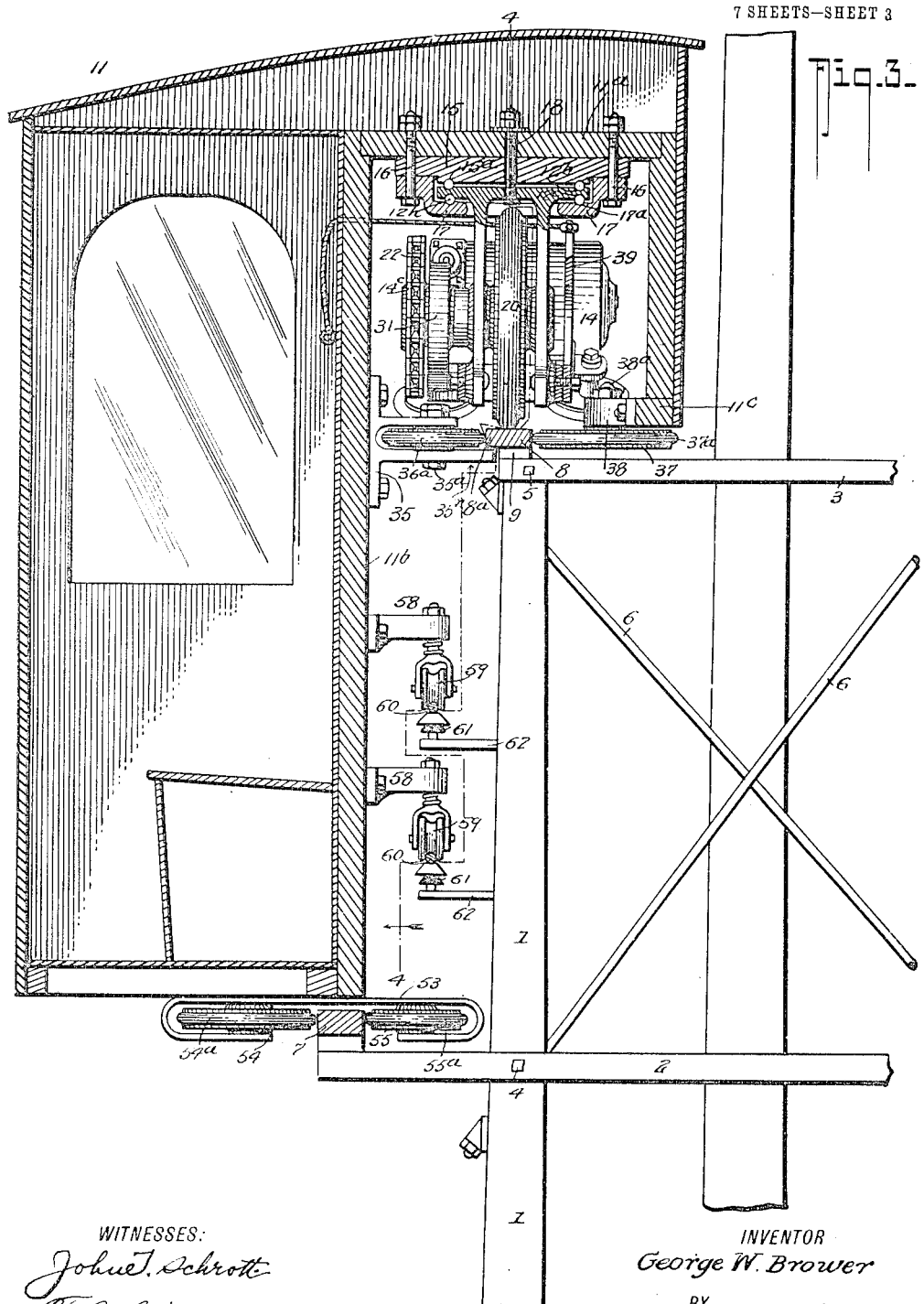

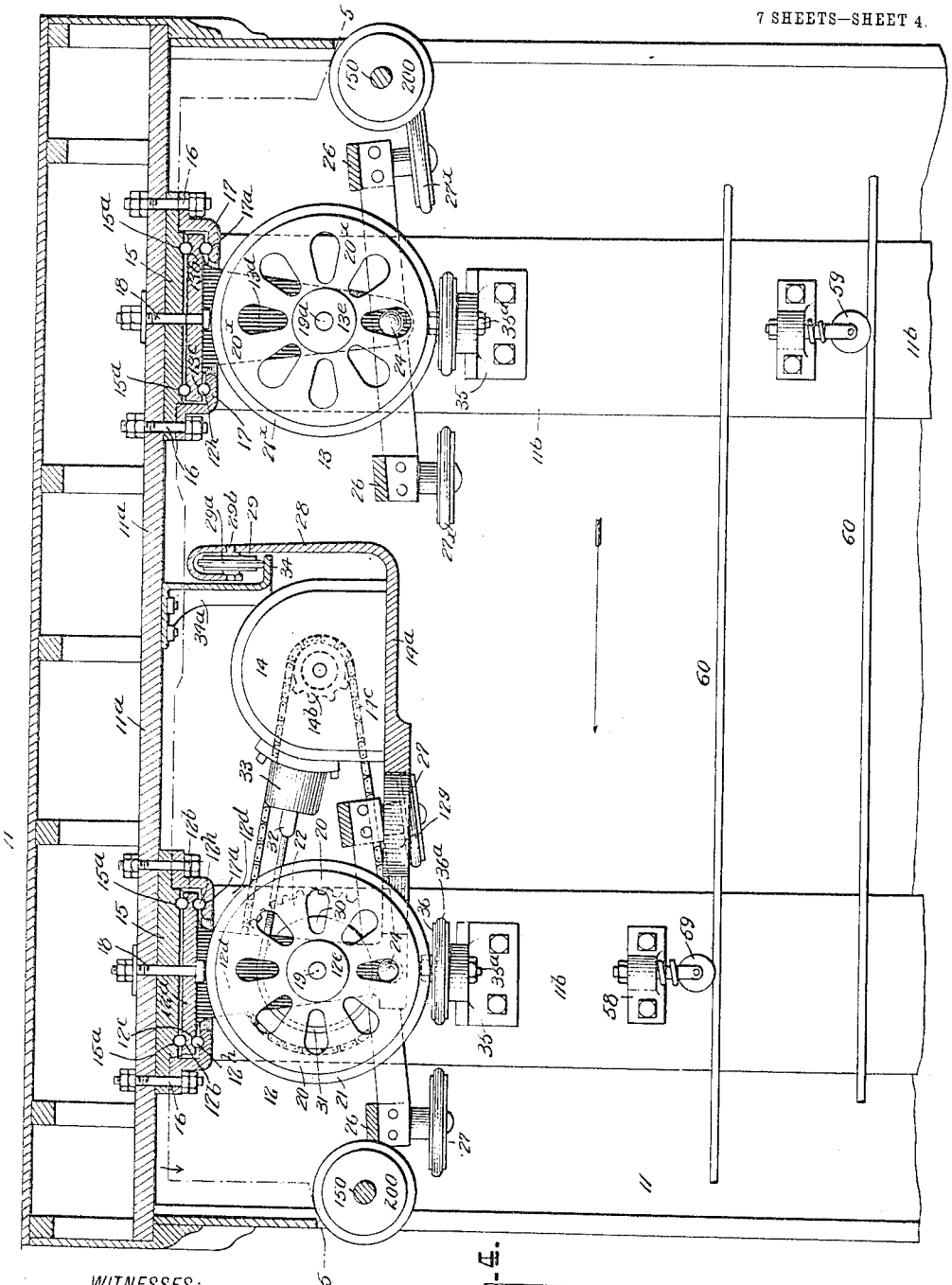

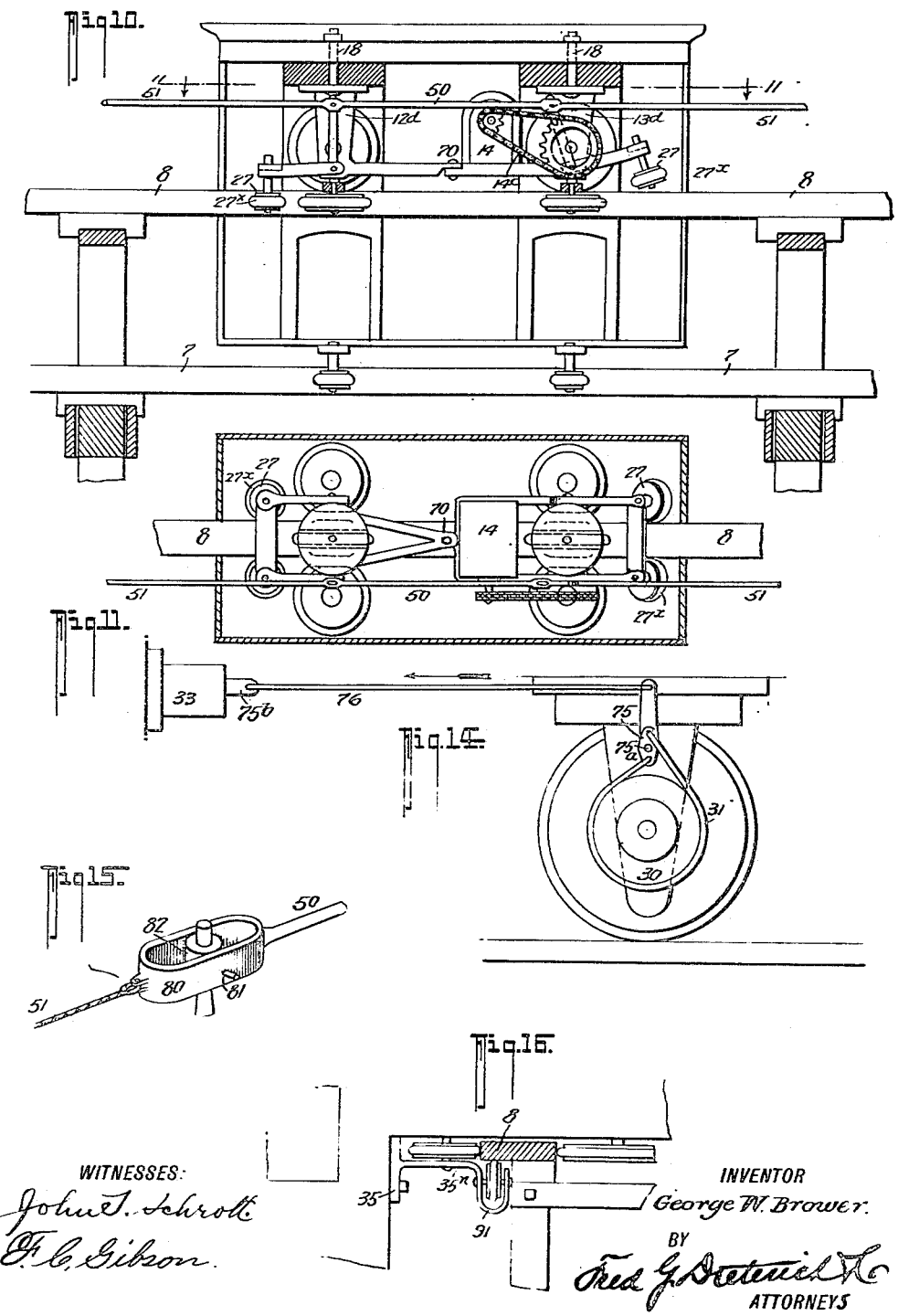

UNITED STATES PATENT OFFICE.

GEORGE W. BROWER, OF SANTA MONICA, CALIFORNIA.

SUSPENDED RAILWAY.

No. 818,608.  Specification of Letters Patent.  Patented April 24, 1906.

Application filed January 31, 1906. Serial No. 298,779.

*To all whom it may concern:*

Be it known that I, GEORGE W. BROWER, residing at Santa Monica, in the county of Los Angeles and State of California, have invented certain new and useful Improvements in Suspended Railways, of which the following is a specification.

My invention relates to certain new and useful improvements in suspended railways, and it particularly seeks to provide a railway of this character of a very simple and economical construction which can be easily and cheaply operated and can be used along the right of way of telegraph-lines and can run alongside of the telegraph-poles.

My invention also includes means whereby the car is enabled to turn short curves with the greatest ease, and means are also provided whereby the car can be run with the greatest freedom from jar and vibration and with the least possible noise.

Generically, my invention includes a suspended railway, the cars of which include suitable trucks, each of which trucks comprises main driving and supporting wheels, a pair of pilot-wheels at the front and rear of the drive-wheels, and means for shifting the pilot-wheels so that only one set is in operation at a time. A pair of fixed retaining-wheels, one at each side of the drive-wheel, coöperate with the driver-wheels.

My invention also includes a novel means for mounting the drive-motor to the truck, so that it and the driving-gear will move with the truck on its pivot-axis, so as to always maintain the proper alinement between the drive-motor and the drive-wheel.

My invention also includes a novel arrangement for pendently mounting the car-body, whereby the rails or overhead support can be conveniently connected to the ordinary type of telegraph-poles and in such manner that the weight of the car, the trucks, and the drive-motor are balanced to provide for a smooth and safe travel of the car on its trackway.

The manner in which the front and rear trucks are correlatively arranged and combined with the drive-motor, the drive-wheel, and the retaining and guide wheels also forms an essential feature of my present invention, as does also the manner in which the motor devices are geared up with the drive-wheel, and the means for providing for the automatic lateral adjustment of the motor and the gear connections that join with the drive-wheel and the combined arrangement of the motor and the manner of sustaining it on the drive-truck, as before intimated.

My invention also comprises a novel construction of running-gear including a truck having a main frame, a vertically-disposed master-wheel supported in said main frame for traveling on top of the upper or main rail, a pair of fixed retaining-wheels rotatable in a plane at right angles to the drive-wheel with their axis of rotation in the same vertical plane with the axis of rotation of the drive-wheel, and a supplemental frame oscillatably supported by the main frame and carrying at the front and rear ends thereof a pair of pilot-wheels, one wheel of each pair adapted to engage one side of the main track, while the other wheel of the same pair engages the other side of the main track, and means connected with the supplemental frame for oscillating the same way, so that only one pair of pilot-wheels (the pair in advance of the driver) will be in operative engagement with main track at a time. The truck also includes a special form of turn-table, whereby the same can be pivotally connected with the car-body to turn on a vertical axis at right angles to the pivotal axis of the drive-wheel and lying in the same plane with such drive-wheel pivotal axis. In addition to the foregoing the truck also includes a novel platform extension for supporting the drive-motor and having means coöperating with the supporting-trackway on the car-body for taking up the weight of the motor and serving to aid in its support.

With other objects in view than I have heretofore enumerated my invention also embodies a novel construction, combination, and arrangement of parts, all of which will be first described in detail and then be specifically pointed out in the appended claims, reference being had to the accompanying drawings, in which—

Figure 1 is a perspective view showing my invention as applied for use. Fig. 2 is a cross-section of the trackway, showing the general arrangement thereof and the general arrangement of the cars on the same when my invention is used along the right of way of the telegraph-lines. Fig. 3 is an enlarged cross-section of the car and a portion of its trackway, taken on a plane approximately through the pivot-axis of the drive-wheel and the retaining wheel-axis. Fig. 4 is a cross-section on the line 4 4 of Fig. 3 looking in the direction of the arrow. Fig. 5 is a horizontal section on the line 5 5 of Fig. 4 looking in the direction of the arrow. Fig. 6 is a perspective view of the front or motor truck. Fig. 7 is a similar view of the rear truck. Fig. 8 is a perspective view of the supplemental frame detached. Fig. 9 is a view of a modified form of truck hereinafter specifically referred to. Fig. 10 is a diagrammatic side elevation of a modified form of my invention. Fig. 11 is a diagrammatic view on the line 11 11 of Fig. 10 looking in the direction of the arrow. Fig. 12 is a diagrammatic cross-section showing how the trestle-work and track structure may be arranged for city use. Fig. 13 is a similar view showing how the telegraph-poles may be used as supports for the trestle-work. Fig. 14 is a detail diagrammatic view of a modified form of magnetic brake mechanism for use in connection with my system, and Fig. 15 is a detail view hereinafter specifically referred to. Fig. 16 is a modification hereinafter referred to.

Referring now to the accompanying drawings, in which like reference numerals and letters indicate like parts in all of the figures, 1 designates the main supporting-posts of the trestle-work, to which the cross-arms 2 2 and 3 3 are secured by bolts 4 and 5 or otherwise, as may be found desirable, brace-rods 6 being also provided for the usual functions.

Secured to the cross-arms 2 2 are the lower guide-rails 7 7, while the upper guide and traction rails 8 8 are secured to the arms 3 3, as shown, suitable spacing-blocks 9 and 10 being provided to raise the rails above the cross-arms. The upper or traction rail 8 projects slightly beyond the spacing-block 10, as at 8$^a$, for a purpose presently explained.

The car 11 is supported upon front and back trucks 12 and 13, of like construction with the exception that the front or motor truck carries the drive-motor 14, as shown in detail in Fig. 6.

In the form of my invention shown in Figs. 1, 2, 3, and 4 there is but one motor-truck, although I desire it understood that both the forward and rear trucks may be made as motor-trucks when desired, as shown in the modified form of my invention in Fig. 9.

Referring now more particularly to Figs. 3, 4, 5, and 6, it will be seen the motor-truck 12 comprises a main supporting-frame consisting of the turn-table 12$^a$, having a ball-race 12$^b$ in its upper face and a second ball-race 12$^c$ on its under face to receive bearing-balls 12$^h$, as shown. A suitable bearing-plate 15, having a ball-race 15$^a$, is secured to the cross-brace 11$^a$ of the car-body by bolts 16, as shown, and the bolts 16 serve to secure a ring 17, having a ball-race 17$^a$ to coöperate with the lower bearing-balls 12$^h$, as shown clearly in Figs. 3 and 4. A king-bolt 18 may be provided for pivotally connecting the turn-table 12$^a$ to the plate 15, if desired, although the turn-table will operate successfully without the use of the king-bolt 18. Projecting downwardly from the turn-table is a pair of arms 12$^d$ 12$^d$, which have bearings 12$^e$ 12$^e$ to support and receive the main drive-shaft 19, which carries the drive-wheel 20, hereinafter again referred to. The downwardly-projecting arms 12$^d$ 12$^d$ terminate in rearwardly-extending horizontal arms 12$^g$ 12$^g$, to which the motor-platform 14$^a$ is bolted or otherwise secured, as shown. The main shaft 19 at one end carries a sprocket-wheel 22, over which and over a sprocket-wheel 14$^b$ on the motor 14 an endless chain 14$^c$ passes, whereby the action of the motor 14 will be imparted to the shaft 19 to turn the drive-wheel 20. The drive-wheel 20 in my invention is provided with a pneumatic tire 21, as shown, or the same may be a cushion tire, if found desirable, and this tire 21 serves to give an easy smooth riding to the car and avoids all unnecessary vibration and jolting and also permits me to use wooden trackways 8 in place of metallic tracks, and hence reduces the cost of construction considerably. The motor-truck also includes a supplemental frame 25, which comprises the parallel arms 25$^a$ 25$^a$, which are centrally fulcrumed at 24 to the downwardly-projecting arms 12$^d$ of the turn-table 12$^a$ and the fulcrums 24. The king-pin 18 and the main drive-shaft 19 lie in the same transverse vertical plane for a purpose presently more clearly understood. The supplemental frame has its parallel members 25$^a$ 25$^a$ connected together at their free ends by U-shaped connecting-straps 26 26, which are firmly secured to the members 25$^a$ in any desired manner, and the straps 26 have laterally-projecting feet 26$^a$, which have bearings 26$^b$ to receive the spindles 26$^d$, upon which the pilot-wheels 27 are pivotally held. The pilot-wheels 27, it will be seen, are four in number and arranged in pairs, one to the front and the other to the rear of the turn-table of the main frame, and the pilot-wheels 27 are spaced apart so that they will bear against the sides of the track 8 when they are in their operating positions, as will be more fully understood presently. On the main drive-shaft 19 I also secure a brake-drum 30, around which a brake-strap 31 takes, and the brake-strap 31 is secured at one end to one of the downwardly-projecting arms 12$^d$ and has its other end connected with the plunger 32 of a magnetic brake-magnet 33, which may be bolted directly to the motor-casing, as shown, if desired. Projecting upwardly from the rear end of the motor-platform 14$^a$ is an arm 28, which carries at its upper end a wheel 29, provided with pneumatic or cushion tires 29ª and rotatable on a shaft 29ᵇ in the arm 28. The wheel 29 rides on a trackway 34 on an arc of a circle having its center on an axial line passing through the kingbolt 18 of the turn-table, and the trackway 34 is secured by a bracket portion 34ª to the supporting-beam 11ª of the car-body, as clearly shown in Fig. 4. The car-body 11 is also provided with vertical supporting-beams 11ᵇ 11ᵇ, to which bearing-brackets 35 are secured, and the bearing-brackets 35 have bearings to receive the bearing-bolts 35ª, upon which a retaining-wheel 36, having pneumatic or cushion tires 36ª, is mounted and arranged to engage the side of the track 8, as clearly shown in Fig. 3, and this wheel forms one of what I shall hereinafter term the "stationary" retaining-wheels to distinguish them from the shiftable pilot-wheels. The axis of rotation of the wheel 36 lies in the same transverse vertical plane as the axis of rotation of the main drive-wheel 20 and the pivot-axis of the truck which passes through the king-bolt 18. Opposite the fixed retaining-wheel 36 is a second fixed retaining-wheel 37, having a tire 37ª of similar form to that 36ª of the wheel 36, and the second fixed retaining-wheel 37 is mounted on a spindle 38ª, secured in the bracket 38, that is fastened to the car-body beams 11ᶜ. The axis of rotation of the wheel 37 and that of the wheel 36 and that of the king-bolt 18 lie in the same vertical transverse plane at all times and in the same vertical transverse plane as the axis of the drive-wheel when the parts are in the position shown in Figs. 3 and 4 and the car is running straight ahead. The wheel 37 engages the side of the track opposite that engaged by the wheel 36, and the arrangement of the wheels 36 37 and the drive-wheel 20 are such that at all times the points of contact of the three wheels just mentioned will lie in the same vertical plane as the axis of rotation of the fixed retaining-wheels and the axis of rotation of the turn-table. The pilot-wheels 27 are also provided with pneumatic or cushion tires 27ˣ. The supplemental frame 25 is oscillatable on its pivots 24 by means of the vertically-extending arm 39, which is secured to one of the bars 25ª by any desired means and to the upper end of which the shifting-rod 50 is pivotally secured. The rear truck 13 is of like construction to the front truck 12, with the exception that it only contains the turn-table 13ª, having the ball-races 13ᵇ and 13ᶜ, corresponding to those on the forward truck, and the downwardly-projecting arms 13ᵈ 13ᵈ, having bearing portions 13ᵉ, in which the main shaft 19ª is held. The rear supporting or drive wheel 20ˣ is mounted on the shaft 19ª, as shown. The wheel 20ˣ has a pneumatic tire 21ˣ similar to that on the front drive-wheel. A supplemental frame 25 is pivotally secured at 24 to the downwardly-projecting arms 13ᵈ 13ᵈ of the rear truck 13 and is of the same construction as the front supplemental frame, the shifting-rod 50 connecting the two supplemental frames together, so that they can be shifted in unison by means of the shifting-rope 51 from within the car, as shown. On the under side of the car-body and in alinement with the front and rear trucks is a pair of laterally-extending bearing-brackets 53 of like construction, which carry the lower retaining-wheels 54 55, respectively, which are also provided with pneumatic or cushion tires 54ª 55ª, and the said wheels 54 55 are arranged in the same horizontal plane and bear against opposite sides of the lower track 7, as clearly shown in Fig. 3. 58 designates a pair of bracket members secured to the car-body, which carry the trolley-wheels 59 59, that bear against the trolley-wires 60, mounted on insulators 61 on brackets 62, projecting from the main columns 1 of the trestle-work.

So far as described the manner in which my invention operates will be best understood by reference to Figs. 1, 2, 3, 4, and 5 of the drawings, from which it will be seen that when the cars are running in the direction of the arrow in Fig. 4 the operating-rod 50, which controls the supplemental frame 25, is shifted in the direction in which the car is going to move the supplemental frames to the position shown in Fig. 4, so that the front pair of pilot-wheels are in operative engagement with the track-rail 8 and rotatable in the same horizontal plane with the fixed retaining-wheels 36 37, while the rear pilot-wheels of each truck are up out of engagement with the track, as shown. This enables shorter turns to be made by my railway than would be possible were all four pilot-wheels of the supplemental frame simultaneously in engagement with the track and also insures the positive turning of the turn-table to always keep the driver-wheels directed in proper vertical alinement with the track, since the forward pilot-wheels shift the turn-table immediately as the drive-wheel enters the turn and in proportion to the arc of the curve in the rail. As the turn-table is shifted on its pivot-axis the motor 14 and all the other carried parts of the turn-table will likewise be shifted, the wheel 29 running upon its track 34 to relieve the truck of the excess weight of the motor. Thus the motor will be shifted from the central alinement to one side or the other, depending upon the direction in which the car is turning. This is essential, since were the motor stationary with respect to the car-body and shiftable with respect to the drive-axis of the truck it would be impossible to obtain a satisfactory gearing between the motor and the drive shaft; but by arranging the parts as shown clearly in Fig. 6 of the drawings the motor-shaft and the drive-shaft are always in parallel alinement with one another and the drive-pinions of the motor and drive shaft will always be in the same alinement, and thus the drive-chain will be properly maintained thereon, and the motor will easily operate to drive the car. Now assume it it desired to reverse the direction of movement of the car. It is only necessary to shift the rod 50 in the direction opposite to the arrow in Fig. 4, when the rear pilot-wheels will be brought into engagement with the track 8 and the forward pilot-wheels lifted up out of engagement therewith. The motorman can then reverse his current and reverse the direction of travel of the car and be assured that the drive-wheels will be always maintained in their proper alinement with the track by the pilot-wheels in advance thereof.

In Fig. 9 I have shown a slightly-modified form of my invention, in which there are two motor-trucks employed of like construction, and in Fig. 9 I have shown also an additional modification of my invention in that in this form the means for shifting the front and rear pilot-wheels is somewhat different. In this form of my invention the downwardly-projecting arms $12^d$ $12^d$ of the turn-table have front and rear extensions $12^m$ $12^m$, terminating in bearings $12^n$ to receive longitudinally-shiftable spindles $26^m$, which carry the pilot-wheels 27, and its shafts are shifted alternately in pairs through the medium of the oscillating lever 65, which is linked to the shafts $26^n$ at their upper ends by the links 66, which are pivotally secured to the levers 65 and to the shafts $26^m$, as shown. The levers 65 have upwardly-projecting lever-arms $65^x$, which are operatively connected together by the shift-rod 50, as shown, so that the levers 65 of the front and rear trucks can be simultaneously operated in the same manner as for the form shown in Figs. 1, 2, 3, and 4 of the drawings.

In Figs. 10 and 11 I have shown a still further modification of my invention, in which the front and rear trucks are pivoted together, as at 70, and in which only one set of pilot-wheels 27 is provided for each truck, since in this form of my invention the front and rear trucks operate as one, the one set of pilot-wheels of the one truck sufficing to shift both trucks, as will be clearly understood by reference to the drawings. In this form of my invention the pilot-wheels are shifted similarly to the way they are shifted in the other forms of my invention through the medium of the shifting rod 50, as shown.

In Fig. 14 I have shown a slightly-modified form of magnetic brake in which the brake-band 31 practically encircles the drum 30 and is connected to the pivot-link 75, that is fulcrumed at $75^a$, and which has the arm 76, that connects with the plunger $75^b$ of the brake-magnet 33, as shown, so that as braking power is applied by the magnet 33 the lever will be shifted in the direction of the arrow to tighten the brake-band around the drum.

In Fig. 15 I have shown the universal connection between the shifting-rod 50 and the lever that operates the oscillating supplemental frame 25, by reference to which figure it will be seen that the joint comprises the link 80, which is fulcrumed at 81 to the collar 82, that is loosely held on the operating-lever, as shown.

From the foregoing description, taken in connection with the accompanying drawings, it is thought the complete construction, operation, and many advantages of my invention will be readily understood by those skilled in the art to which it appertains, and it will be also seen that by providing the various supporting-wheels, retaining-wheels, pilot-wheels, and drive-wheels, &c., with pneumatic or cushion tires I am enabled to obtain an easy smooth running of the car and am also enabled to construct the tracks of wood instead of metal, thus greatly reducing the cost of construction of the system.

This system is particularly adapted for use in cities as well as in countries, and when my invention is used in cities the trackway can be constructed, as shown diagrammatically in Fig. 12, so that the cars will run alongside of the telegraph-poles, and thus not take up unnecessary room in the street. Again, I may utilize the telegraph-poles as supports for the track structure, as shown in Fig. 13.

By use of my railway system a very high rate of speed may be attained, as the pilot-wheels will positively guide the drive-wheels on the track and keep them always in proper alinement, so that they will not run off, and to insure the car from jumping the track when running at a high rate of speed I project the free ends $35^n$ of the bracket 35 under the track 8, as clearly shown in Fig. 3, and my system can be used along the right of way of telegraph-lines, thus avoiding the necessity of a special right of way and reducing the cost of installation. Again, my system is particularly advantageous in countries of desert land as well as in rocky districts, as it is unnecessary to make deep and expensive cuts through the rocky districts, and the danger of sand drifts over the tracks now so common in surface lines on desert land is avoided.

In Fig. 16 I have shown a slightly-modified form of my invention in which the means engaging the under side of the track-rail or for preventing the car from jumping the tracks consists of a small wheel held in a bracket 91, secured to the car-body, as shown. I also desire it understood that while I have shown an electric motor for the driving power I may use any other suitable motor in place of the electric motor, such as a gasolene-engine or the like, as the same *per se* forms no part of my present invention.

To provide for taking the strain off the main driver-wheels should the tires become punctured, I place wheels 200, mounted on axles 130, in front of the trucks, as shown.

I claim—

1. In a suspended railway, the combination with a car-body and an upper and lower trackway, of a plurality of trucks for riding on the upper trackway and supporting the car-body, said trucks comprising a turn-table, a main drive-wheel carried thereby, a supplemental frame pivotally secured to the turn-table frame, pilot-wheels carried by said supplemental frame and arranged in pairs forwardly and rearwardly of the drive-wheel, means for shifting said supplemental frame to maintain but one pair of pilot-wheels in operative engagement with the track at a time, and retaining-wheels beneath the car-body for engaging the lower tracks substantially as shown and described.

2. In a suspended railway, the combination with a car-body and an upper and lower trackway, of a plurality of trucks for riding on the upper trackway and supporting the car-body, said trucks comprising a turn-table, a main drive-wheel carried thereby, a supplemental frame pivotally secured to the turn-table frame, pilot-wheels carried by said supplemental frame and arranged in pairs forwardly and rearwardly of the drive-wheel, means for shifting said supplemental frame to maintain but one pair of pilot-wheels in operative engagement with the track at a time, retaining-wheels beneath the car-body for engaging the lower tracks, and a drive-motor carried by one of said trucks, gear connections between the drive-motor and the drive-wheel of the truck, substantially as shown and described.

3. In a suspended railway, the combination with a car-body and an upper and a lower trackway, of a plurality of trucks for riding on the upper trackway and supporting the car-body, said trucks comprising a turn-table, a main drive-wheel carried thereby, a supplemental frame pivotally secured to the turn-table frame, pilot-wheels carried by said supplemental frame and arranged in pairs forwardly and rearwardly of the drive-wheel, means for shifting said supplemental frame to maintain but one pair of pilot-wheels in operative engagement with the track at a time, retaining-wheels beneath the car-body for engaging the lower tracks, and a pair of fixed retaining-wheels carried by the car-body for engaging the upper track rail, substantially as shown and described.

4. In a suspended railway, the combination with a car-body and an upper and a lower trackway, of a plurality of trucks for riding on the upper trackway and supporting the car-body, said trucks comprising a turn-table, a main drive-wheel carried thereby, a supplemental frame pivotally secured to the turn-table frame, pilot-wheels carried by said supplemental frame and arranged in pairs forwardly and rearwardly of the drive-wheel, means for shifting said supplemental frame to maintain but one pair of pilot-wheels in operative engagement with the track at a time, retaining-wheels beneath the car-body for engaging the lower tracks, a drive-motor carried by one of said trucks, gear connections between the drive-motor and the drive-wheel of the truck, and a pair of fixed retaining-wheels carried by the car-body for engaging the upper track-rail, substantially as shown and described.

5. In a suspended railway of the character stated, a car, track-engaging wheels beneath the car-body and arranged in the same horizontal plane for engaging opposite sides of a track, a pair of trucks secured to the car-body at the top thereof from which the car-body is suspended, said trucks each including a main frame including a turn-table, a drive-shaft carried by the main frame, a drive-wheel on said drive-shaft, a supplemental frame pivotally secured to said main frame, pilot-wheels carried by said supplemental frame and arranged in pairs, one pair at the front and the other pair at the rear of the drive-wheel, means for shifting said supplemental frame to cause one pair of pilot-wheels to engage the track at a time, a pair of retaining-wheels adjacent the drive-wheel for engaging the sides of a track, one of said trucks including a rearwardly-extending platform, a motor secured thereto, gear connections between the motor and the drive-wheel of said truck, a hanger carried by the motor-platform at the rear, a wheel fulcrumed in said hanger, a track suspended from the car-body for said last-named wheel to ride on, substantially as shown and described.

6. In a suspended railway of the class described, the combination with a trackway consisting of an upper or main rail and a lower rail, of a car comprising a body adapted to be suspended over said rails, a pair of trucks pivotally mounted on said car-body, drive-wheels carried by said trucks for engaging the upper track, means carried by the trucks and operating in advance of the drive-wheel for positively directing the drive-wheel in alinement with the track, similar means at the rear of the drive-wheel for the same purpose, retaining-wheels adjacent the truck for engaging the sides of the track, retaining-wheels beneath the car-body for engaging the sides of the lower track, means for directing either the front or rear drive-wheel directing means into operative engagement with the track at times substantially as shown and described.

7. In a suspended railway of the class described, the combination with a trackway consisting of an upper or main rail and a lower rail, of a car comprising a body adapted to be suspended over said rails, a pair of trucks pivotally mounted on said car-body, drive-wheels carried by said trucks for engaging the upper track, means carried by the trucks and operating in advance of the drive-wheels for positively directing the drive-wheel in alinement with the track, similar means at the rear of the drive-wheel for the same purpose, retaining-wheels adjacent the truck for engaging the sides of the track, retaining-wheels beneath the car-body for engaging the sides of the lower track, means for directing either the front or rear drive-wheel directing means into operative engagement with the track at times, and cushion-tires for all of said wheels, substantially as shown and described.

8. In a suspended railway, the combination with a pair of fixed track-engaging retaining-wheels, of a truck, said truck including a turn-table pivotally mounted to the car-body with its axis of rotation parallel to and in the same transverse vertical plane with the axis of rotation of the retaining-wheels, means at the front of the drive-wheel and at the rear of the drive-wheel for operating the turn-table to bring the drive-wheel into proper alinement with the track at all times, and means for shifting the front directing means into engagement with the rail while simultaneously shifting the rear directing means out of engagement with the rail, substantially as shown and described.

9. In a suspended railway, the combination with a pair of fixed track-engaging retaining-wheels, of a truck, said truck including a turn-table pivotally mounted to the car-body with its axis of rotation parallel to and in the same transverse vertical plane with the axis of rotation of the retaining-wheels, of means at the front of the drive-wheel and at the rear of the drive-wheel for operating the turn-table to direct the drive-wheel into proper alinement with the track at all times, means for shifting the front directing means into engagement with the rail while simultaneously shifting the rear directing means out of engagement with the rail, and supplemental retaining-wheels mounted beneath the car-body for engaging a second rail, said supplemental retaining-wheels arranged in pairs with their axis of rotation in the same vertical plane as the axis of rotation of the first-mentioned retaining-wheels, substantially as shown and described.

10. In a railway of the class described, the combination with an upper and lower track and trestle-work therefor, of a car adapted to run on said track structure and comprising a car-body, trucks for supporting said car, said trucks including a turn-table, ball-bearings for said turn-table, said turn-table having downwardly-projecting arms, a drive-shaft mounted in bearings thereon, a drive-wheel on said drive-shaft between said arms for riding on the upper rail, retaining-wheels rotatable in a plane at right angles to the drive-wheel for engaging each side of the upper rail, pilot-wheels arranged in pairs one pair in front and the other in back of the drive-wheel, a drive-motor mounted on one of said trucks and geared with the drive-wheel shaft, means for mounting said drive-motor on said truck to be laterally shiftable as the turn-table turns, and means for shifting the pilot-wheels on each truck simultaneously to bring either the forward or rearward pairs of pilot-wheels of each truck into engagement with the track, and supplemental retaining-wheels beneath the car-body for engaging the lower track substantially as shown and described.

11. In a suspended railway, the combination with a car-body, of a truck therefor, said truck comprising a main frame having a turn-table portion and downwardly-projecting arms, ball-bearing connections between the turn-table portion and the car-body for supporting the truck, on the car-body, a master drive-wheel carried by said main frame, a supplemental frame pivotally secured to said main frame, pilot-wheels carried by said supplemental frame, and means for oscillating said supplemental frame on its pivots.

12. In a suspended railway, the combination with a car-body, of a truck therefor, said truck comprising a main frame having a turn-table portion and downwardly-projecting arms, ball-bearing connections between the turn-table portion and the car-body for supporting the truck on the car-body, a master drive-wheel carried by said main frame, a supplemental frame pivotally secured to said main frame, pilot-wheels carried by said supplemental frame, means for oscillating said supplemental frame on its pivots, and resilient tires for all of said wheels, substantially as shown and described.

13. In a suspended railway, the combination with a car-body, of a truck therefor, said truck comprising a main frame having a turn-table portion and downwardly-projecting arms, ball-bearing connections between the turn-table portion and the car-body for supporting the truck on the car-body, a master drive-wheel carried by said main frame, a supplemental frame pivotally secured to said main frame, pilot-wheels carried by said supplemental frame, means for oscillating said supplemental frame on its pivots, said main frame having rearwardly-projecting portions, a motor-platform secured to said rearwardly-projecting portions, a hanger extending upwardly from the rear of said platform, a wheel rotatably mounted in the upper end of said hanger, a trackway supported from the car-body for coöperating with said last-named wheel, gear connections between the motor and the drive-axle, and a magnetic brake for said drive-axle, substantially as shown and described.

14. In a suspended railway, the combination with a car-body, of a truck therefor, said truck comprising a main frame having a turn-table portion and downwardly-projecting arms, ball-bearing connections between the turn-table portion and the car-body for supporting the truck on the car-body, a master drive-wheel carried by said main frame, a supplemental frame pivotally secured to said main frame, pilot-wheels carried by said supplemental frame, means for oscillating said supplemental frame on its pivots, said main frame having laterally-projecting portions, a motor-platform secured to said rearwardly-projecting portions, a hanger extending upwardly from the rear of said platform, a wheel rotatably mounted in the upper end of said hanger, a trackway supported from the car-body for coöperating with said last-named wheel, gear connections between the motor and the drive-axle, a magnetic brake for said drive-axle, and resilient tires for all of said wheels, substantially as shown and described.

15. In a suspended railway, a truck comprising a main frame, a master drive-wheel rotatably mounted therein, for rotation in a vertical plane, means carried by the truck for driving said drive-wheel, said truck including a turn-table, means for permitting the drive means to have lateral adjustment as the turn-table turns, a supplemental frame secured to said main frame, pilot-wheels carried by said supplemental frame and arranged in pairs, one pair at the front and the other at the rear of the drive-wheel and means for simultaneously shifting all of said pilot-wheels in pairs to direct one pair of pilot-wheels in engagement with the tracks while simultaneously moving the other pair of pilot-wheels out of engagement with the track, substantially as shown and described.

16. In a suspended railway, a track comprising an upper rail and a lower rail arranged in different vertical and horizontal planes, of a car-body adapted to be suspended over said rails, retaining-wheels mounted on the under side of said car-body for engaging the sides of the lower rail, a pair of trucks pivotally secured to the car-body for coöperating with the upper rail, retaining-wheels mounted on the car-body for engaging the sides of the upper rail, each of said trucks comprising a main frame, including a turn-table having a ball-bearing connection with the car-body, and including downwardly-projecting arms, a master drive-wheel mounted between said arms, a drive-shaft for said drive-wheel mounted in bearings in said arms, a supplemental frame secured to said main frame, a pair of pilot-wheels mounted in said supplemental frame in front of the drive-wheel, a second pair of pilot-wheels mounted in said supplemental frame to the rear of the drive-wheel, and means for simultaneously operating the pilot-wheels of each truck to shift one pair of each truck into engagement with the upper rail, while simultaneously shifting the other pair of each truck out of engagement with the upper rail, substantially as shown and described.

17. In a suspended railway, a track comprising an upper rail and a lower rail arranged in different vertical and horizontal planes, of a car-body adapted to be suspended over said rails, retaining-wheels mounted on the under side of the car-body for engaging the sides of the lower rail, a pair of trucks pivotally secured to the car-body for coöperating with the upper rail, retaining-wheels mounted on the car-body for engaging the sides of the upper rail, each of said trucks comprising a main frame, including a turn-table having a ball-bearing connection with the car-body, and including downwardly-projecting arms, a drive-shaft for said drive-wheels mounted in bearings in said arms, a supplemental frame secured to said main frame, a pair of pilot-wheels mounted in said supplemental frame in front of the drive-wheel, a second pair of pilot-wheels mounted in said supplemental frame to the rear of the drive-wheel, and means for simultaneously operating the pilot-wheels of each truck to shift one pair of each truck into engagement with the upper rail, while simultaneously shifting the other pair of each truck out of engagement with the upper rail, a drive-motor, gear connections between the drive-motor and the drive-wheel shaft of one truck, and means for mounting said motor, to be adjustable in the arc of a circle having as its center the pivotal axis of the turn-table and in proportion to the degree of turning of the turn-table, substantially as shown and described.

18. In a suspended railway, a car-body, a pair of trucks from which said car-body is suspended, each of said trucks including a main frame pivotally secured to the car-body, a master drive-wheel carried by said main frame for riding on the track, a pair of fixed retaining-wheels at each side of the driver-wheels for engaging each side of the track, pilot-wheels for positively bringing the drive-wheel into proper alinement with the track at all times, supplemental retaining-wheels beneath the car-body for engaging the lower track and means coöperating with the upper track for preventing the car jumping the track, substantially as shown and described.

19. In a suspended railway, a car-body, a pair of trucks from which said car-body is suspended, each of said trucks including a main frame pivotally secured to the car-body, a master drive-wheel carried by said main frame for riding on the track, a pair of fixed retaining-wheels at each side of the driver-wheels for engaging each side of the track, pilot-wheels for positively bringing the drive-wheel into proper alinement with the track at all times, supplemental retaining-wheels beneath the car-body for engaging the lower track, means coöperating with the upper track for preventing the car jumping the track, a drive-motor, gear connections between the drive-motor and one of the drive-wheel shafts, and means for mounting said drive-motor to maintain positive alinement with the drive-wheel shaft, as the said drive-wheel turns to meet a curve in the track substantially as shown and described.

20. In a suspended railway, comprising the combination with an upper and a lower track-rail, of a car-body suspended over said rails, retaining-wheels beneath said car-body for engaging the lower track-rail, fixed retaining-wheels carried by said car-body for engaging the sides of the upper track-rail, a pair of trucks pivotally secured to the car-body, drive-wheels mounted in said trucks for riding on the upper track-rail, a drive-motor, gear connections between said drive-motor and one of said drive-wheel shafts, means operating in advance of the drive-wheel and engaging the upper track for shifting the truck to maintain the drive-wheel in proper alinement with the track to meet curves therein, and for simultaneously shifting the drive-motor correspondingly to the drive-wheel to maintain proper alinement between the drive-motor and the drive-wheel shaft, and a hanger coöperatively connected with the drive-motor support and the car-body for taking up the weight of the drive-motor, all being arranged substantially as shown and described.

21. In a suspended railway, the combination with a car-body, and an upper and a lower trackway, of a plurality of trucks for riding on the upper trackway and supporting the car-body, said trucks each comprising a turn-table, a main drive-wheel carried thereby, a supplemental frame pivotally secured to the turn-table frame, pilot-wheels carried by the supplemental frame and arranged in pairs, forwardly and rearwardly of the drive-wheel, means for shifting the supplemental frame to maintain but one pair of pilot-wheels in operative engagement with the truck at a time, retaining-wheels beneath the car-body for engaging the lower tracks, pneumatic tires for the main wheels and supplemental wheels arranged at the front and rear of the car-body for supporting the same at times substantially as shown and described.

GEORGE W. BROWER.

Witnesses:
   ALBERT E. DIETERICH,
   JOHN L. FLETCHER.